US008667099B2

(12) United States Patent
Silverman et al.

(10) Patent No.: US 8,667,099 B2
(45) Date of Patent: *Mar. 4, 2014

(54) WIRELESS SYNCHRONIZATION OF MEDIA CONTENT AND SUBSCRIPTION CONTENT

(75) Inventors: Andrew L. Silverman, Redmond, WA (US); Dennis Kiilerich, Seattle, WA (US); Joshuah Vincent, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/272,641

(22) Filed: Oct. 13, 2011

(65) Prior Publication Data
US 2012/0030325 A1 Feb. 2, 2012

Related U.S. Application Data

(63) Continuation of application No. 12/165,553, filed on Jun. 30, 2008, now Pat. No. 8,069,232.

(51) Int. Cl.
*G06F 15/177* (2006.01)
(52) U.S. Cl.
USPC ............................ 709/220; 709/221; 709/222
(58) Field of Classification Search
USPC .......................................... 709/220, 221, 222
See application file for complete search history.

(56) References Cited

U.S. PATENT DOCUMENTS

| | | | |
|---|---|---|---|
| 7,020,704 | B1 | 3/2006 | Lipscomb et al. |
| 7,215,660 | B2 * | 5/2007 | Perlman ........................ 370/338 |
| 7,412,534 | B2 * | 8/2008 | Tsang et al. .................. 709/231 |
| 7,472,177 | B2 | 12/2008 | Bose |
| 7,526,762 | B1 | 4/2009 | Astala et al. |
| 7,574,493 | B2 * | 8/2009 | Hutcheson et al. ........... 709/221 |
| 8,005,217 | B2 * | 8/2011 | Pham et al. .................... 380/247 |
| 8,069,232 | B2 * | 11/2011 | Silverman et al. ............ 709/222 |
| 2002/0147027 | A1 | 10/2002 | Alford et al. |

(Continued)

FOREIGN PATENT DOCUMENTS

| | | |
|---|---|---|
| CN | 1993689 | 7/2007 |
| JP | 2006067231 | 3/2005 |

(Continued)

OTHER PUBLICATIONS

Extended European Search Report from the European Patent Office regarding Application No. 09774197.9 dated Sep. 25, 2012.

(Continued)

*Primary Examiner* — Asghar Bilgrami
(74) *Attorney, Agent, or Firm* — Micah Goldsmith; Glen Johnson; Micky Minhas

(57) ABSTRACT

Arrangements are provided which use a host computer to configure a wireless portable device's network connection parameters. The radio on the portable device may be used to help locate nearby accessible wireless networks. Once a synchronization relationship between the portable device and a media library on a host computer is established, periodically updated content, such as podcasts, may be discovered and subscribed to using software on the host computer, and the content synchronized with the host computer. A portable device may manage episodic content, such as podcasts, using the device's own wireless connection, and may further send such content to other portable devices. A central user profile may be set up on a web server to synchronize multiple wireless or wired devices.

21 Claims, 9 Drawing Sheets

(56) References Cited

U.S. PATENT DOCUMENTS

| | | |
|---|---|---|
| 2003/0195010 A1 | 10/2003 | Pattabiraman et al. |
| 2004/0198319 A1 | 10/2004 | Whelan et al. |
| 2005/0260996 A1 | 11/2005 | Groenendaal |
| 2005/0262146 A1* | 11/2005 | Grace et al. ............... 707/104.1 |
| 2006/0168351 A1 | 7/2006 | Ng et al. |
| 2006/0190616 A1 | 8/2006 | Mayerhofer et al. |
| 2006/0223556 A1 | 10/2006 | Xu et al. |
| 2006/0264227 A1 | 11/2006 | Takahashi et al. |
| 2006/0265503 A1 | 11/2006 | Jones et al. |
| 2007/0050458 A1 | 3/2007 | Rotzoli et al. |
| 2007/0077921 A1 | 4/2007 | Hayashi et al. |
| 2007/0118873 A1 | 5/2007 | Houh et al. |
| 2007/0130457 A1 | 6/2007 | Kamat et al. |
| 2007/0130594 A1 | 6/2007 | Hidary et al. |
| 2007/0155307 A1 | 7/2007 | Ng et al. |
| 2008/0086760 A1* | 4/2008 | Jiang et al. ........................ 726/3 |
| 2008/0175187 A1 | 7/2008 | Lowry et al. |
| 2009/0219209 A1 | 9/2009 | Bush et al. |
| 2009/0327449 A1 | 12/2009 | Silverman et al. |

FOREIGN PATENT DOCUMENTS

| | | |
|---|---|---|
| JP | 2005328522 | 11/2005 |
| JP | 2006157815 | 6/2006 |
| JP | 2006332863 | 12/2006 |
| JP | 2008124686 | 5/2008 |
| JP | 2009510610 | 3/2009 |
| WO | WO 2004/015930 | 2/2004 |
| WO | WO 2007/041074 | 4/2007 |

OTHER PUBLICATIONS

Meng, Peter, "Podcasting & Vodcasting", Mar. 2005, 14 pages.
"Podcast Creation Guide", 2005, Apple Computer, Inc., 31 pages.
"Getting the Scoop on Podcasting", Podcasting for Dummies, Wiley Publishing, Inc., 2006, 20 pages.
"Podcaster Tech Specs" accessed at http://www.apple.com/itunes/store/podcaststechspecs.html on Aug. 2, 2007, 13 pages.
International Search Report regarding PCT Application PCT/US2009/048982, dated Jan. 25, 2010, 3 pages.
Office Action from the State Intellectual Property Office of the People's Republic of China regarding Application No. 200980126035.7 dated Dec. 12, 2012.
European Search Report from the European Patent Office Action regarding Application No. 13181088.9 dated Sep. 23, 2013.
Office Action from the Japan Patent Office regarding Application No. 2011-516744 dated May 18, 2012.
Examination Report from the European Patent Office Action regarding Application No. 13181088.9 dated Oct. 7, 2013.

* cited by examiner

WIRELESS SYNCHRONIZATION OF MEDIA CONTENT AND SUBSCRIPTION CONTENT

CROSS-REFERENCE TO RELATED APPLICATIONS

This application is a continuation of and claims priority to U.S. patent application Ser. No. 12/165,553 filed on Jun. 30, 2008, which is incorporated by reference in its entirety.

BACKGROUND

As digital media technology improves and the price of storage decreases, users increasingly host collections of digital media (for example, audio, video, images, graphics, and like) on their personal computers and/or network-based data storage services. But users often desire for their digital media collections to be portable. More and more, users seek to transfer all or some of their collections to portable devices. Examples of portable devices include but are not limited to personal media players, personal digital assistants, phones, portable computers, in-vehicle devices, and other devices.

With the advent of relatively high capacity storage on portable devices, users can store large quantities of media content on their portable devices. The process of transferring media files between a host computer and a portable device is termed synchronization. For example, the media transfer protocol (MTP) may be combined with the AutoSync® functionality of Windows Media Player® to accomplish synchronization.

Synchronization is often performed using a wired connection between a portable device and a host computer. For example, in the most common implementation of MP3 players and other related digital media playback devices, the content is placed on the device using a wired USB or "Firewire" IEEE 1394 cable. Certain devices have also implemented wireless data transfer methods using 802.11 "WiFi" connections or Bluetooth. For example, some portable devices allow wireless communication between multiple portable devices or between the device and a web-based service. However, the information exchanged is generally limited to downloads of commercial paid content from a proprietary store, or exchange of information of how to download a particular song from the proprietary store between two paying subscribers. "Podcast"-style periodic episodic content is generally not supported by such systems.

Other systems include the Windows Mobile® operating system platform, which is available from Microsoft Corporation of Redmond, Wash., and is used in a variety of phones and handheld PCs, and the same supports synchronization of a variety of information between the portable device and an associated host computer using a wireless connection. In these systems, however, the portable device's wireless configuration is set up on the portable device itself, using a graphical user interface ("GUI") of the portable device.

In particular, users employ a GUI supported by a display screen that is incorporated into the player in order to configure the wireless configuration, although a primary function of such a GUI is to navigate among various menus to make selections of media content, control operation of the portable device, set preferences, and the like. The menus are organized in a hierarchical manner and the user will generally interact with user controls (e.g., buttons and the like) to move within a menu and jump to different menus to accomplish the desired functions.

As portable devices accumulate more onboard storage and support more features and functions, the GUIs needed to control them have often become larger and more complex to operate. For example, some current media players can store thousands of songs, videos, and photographs, play content from over the air radio stations, and enable shared experiences through device-to-device connections. Navigating through such large volumes of content and controlling the user experience as desired can often mean working through long series of hierarchical menus. And when such GUIs are also employed to configure other utility functions, such as wireless connection configurations, user operations may often be complicated.

SUMMARY

In one aspect, arrangements are provided which employ the rich user interface of a host computer to configure a wireless portable device's network connection parameters. The arrangement may employ a radio on the portable device to help locate nearby accessible wireless networks, and partial configuration information may be returned to the host computer using a wired connection in order to assist in the process of completing the device's wireless configuration process of the portable device.

In a further aspect, once a synchronization relationship between the portable device and a media library on a host computer is established, periodically updated content, such as podcasts, may be discovered and subscribed to using software on the host computer, and the content synchronized with the host computer.

In yet another aspect, a portable device may manage episodic content, such as podcasts. In particular, sufficient information may be provided to a portable device to allow for management of the subscription and download of periodic updates of the content using the device's own wireless connection, with no explicit need for the host computer to procure ongoing content updates from the publishing source, which is usually located on the internet. This aspect may allow for one or more of the following features to be provided. The portable device, having received a subscription from the media library of the host computer, may be enabled to unsubscribe from the content and stop further periodic updates, without input from the host computer. This information may then be transmitted back to the host computer during the synchronization process. The device, having received podcast episodes from the host computer, may send those episodes wirelessly to another device, and the recipient of those episodes may choose to subscribe to that content themselves from their device user interface. In some implementations, this feature may be limited to devices within a certain family, such as those of a particular model or type. All information necessary to subscribe or unsubscribe to the series, such as the Uniform Resource Locator (URL) to the podcast's "RSS" file, which is a file of XML-formatted data describing the series and its episodes, may be transmitted between the two devices, or between devices and their associated host computer.

In an aspect related to wireless podcasting management, the user's subscription data (including but not limited to: which series to subscribe to, how often to check for new episodes, which episodes have been consumed already, bookmarks into partially-consumed episodes, the order in which to play back episodes, and so forth) may be stored in a single user profile stored on a web server associated with a user login or identity. In this way, a variety of possible playback devices (host computers, MP3 players, multipurpose gaming consoles such as the Xbox 360, etc.) may use this single web-based data store to determine what actions to take locally in order to have the current state of all user subscriptions. Such actions could include downloading local copies of series episodes from the original publisher, deleting episodes which can be determined to have been completely consumed elsewhere using another device, beginning playback at an updated location due to prior consumption activity, adding new subscriptions, or removing subscriptions to which the user unsubscribed by using another device.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Corresponding reference characters indicate corresponding parts throughout the drawings.

DETAILED DESCRIPTION

Figure 1:
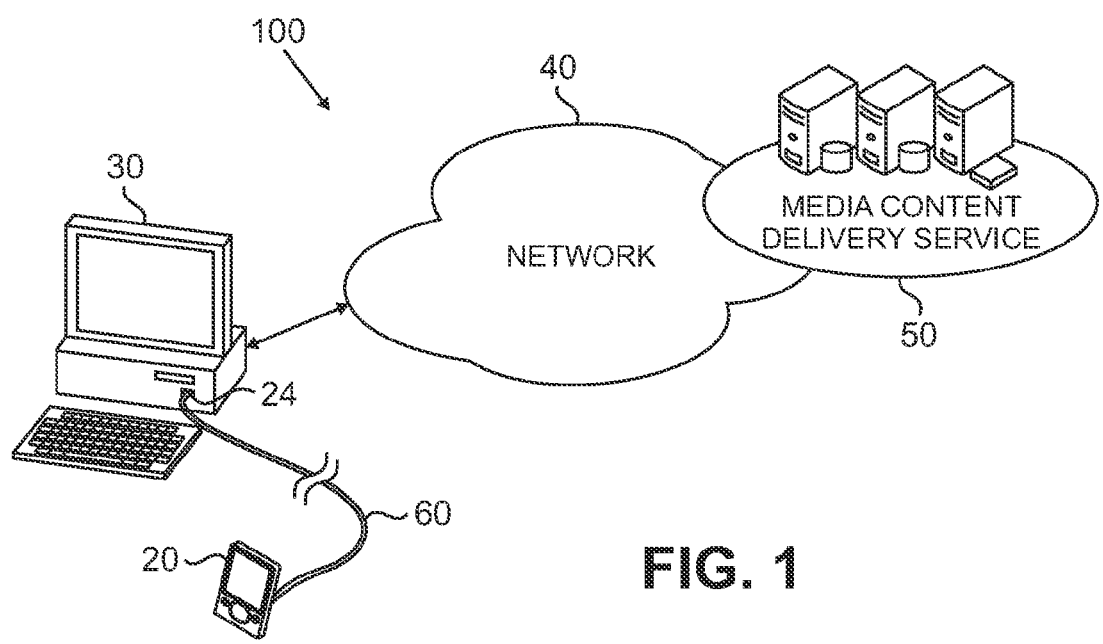
FIG. 1 shows a portable device that is operatively coupled to a host computer and where the host computer is connected to a media content delivery service over a network such as the Internet.

Arrangements are provided for employing a graphical-rich user interface of a host computer to set up a wireless network configuration of a portable device. The arrangement can employ a radio module within the portable device to detect and determine information about a wireless access point such as a WiFi network. Once configured for wireless communications, content may be managed on the portable device, and content may be transmitted from one wireless portable device to another. A user profile may be set up on a web server to which each device associated with a user is synchronized. Changes to content on one device may be propagated through to the others, maintaining each device at the latest state of the media content library.

The following terms and definitions are provided as an initial matter.

"Content items" (within content storage 72 shown in FIG. 1 and discussed further below), "items of content", or just "content" represent any known or later-developed commercial or non-commercial stored digital content (for example, files corresponding to audio, video, images, graphics, text, playlists, and the like) in any known or later-developed format. Content items may also include episodic content, such as podcasts, made up of individual content files and/or an RSS-standard XML file that defines the series and the context, order, and description of the content of the related episodes. Content items may be protected by one or more enforceable intellectual property rights of one or more third parties, such as copyrights, patent rights, trademark rights, or trade secret rights. It is to be appreciated and understood that content items can be embodied on any suitable computer-readable medium.

A "portable device" (element 30 shown in FIGS. 1, 2, 4, and 7 and discussed further below) is any device that can store and/or render content items. Some ability to manage the content items thereon is usually accorded, such as the ability to delete a content item or to add to or modify a playlist. However, in many cases, such functionality is minimal as users prefer to manage their content on a device where the content items may be more easily visualized, such as a "host computer" described below. An exemplary portable device is a portable and/or in-vehicle media player, phone, personal digital assistant, computer, and the like.

A "host computer" (such as element 30 shown in FIGS. 1, 4, and 7 and discussed further below) is any device with functionality to enumerate and/or manage content items. A host computer may also generally render content items. While an exemplary host computer discussed here is a personal computer, the arrangement may be employed with any computing device, such as desktop computers, servers, laptop or notebook computers, handheld computers, personal digital assistants, smartphones, mobile phones, tablet computers, mainframe computers, and the like.

"Synchronization" (such as via link 60 in FIG. 1 and links 140 and 146 shown in FIG. 4 and discussed further below), refers to the act of making two sets of content items on each of two different devices, such as a host computer and a portable device, correspond to each other. The two sets need not be identical; rather, the correspondence is generally to add or delete content items on both, or to manage content items on both. In many cases, content is managed on a host computer and the managed content is periodically synchronized with a portable device that a user carries as part of the user's daily routine. In many cases, host computers can store much more information than portable devices, and thus it is a subset of content items on a host computer that is synchronized with a portable device. Host computers may also synchronize with other host computers. Moreover, a user may synchronize content downloaded from an online service to a mobile phone, and then synchronize the mobile phone to another host computer. Synchronization may be partial; that is, only a portion of the content on one device may be synchronized to another device. This may occur, e.g., when only certain playlists are synchronized or where a user interrupted the synchronization (or the connection was lost) before the synchronization was completed. The synchronization procedure may be automatic or manual. While the term "synchronization"

refers to data and information flowing in both directions between a host computer and a portable device, the term often relates to simply downloading items from a host computer to a portable device.

FIG. 1 shows a system 100 coupled through a network 40 to a media content delivery service 50. The system 100 includes a portable device 20 that is connected to the host computer for synchronization through a wired connection cable 60. The connection cable 60 is coupled to an input port 24 such as a USB port (Universal Serial Bus), in this example. Other arrangements may also be used to implement communications between the portable device 20 and host computer 30 including, for example, those employing wireless protocols such as Bluetooth, or Wi-Fi (i.e., the Institute of Electrical and Electronics Engineers, IEEE 802.11 standards family) that enable connection to a wireless network or access point.

In this example, the portable device 20 is arranged to be operatively couplable with the host computer 30 using a synchronization process by which data may be exchanged or shared between the devices. The synchronization process implemented between the host computer 30 and portable device 20 typically enables media content such as music, video, images, games, information, and other data to be downloaded from the on-line source or media content delivery service 50 over the network 40 such as the Internet to the host computer 30. In this way, the host computer 30 operates as an intermediary or proxy device between the service 50 and the portable device 20.

Figure 2:
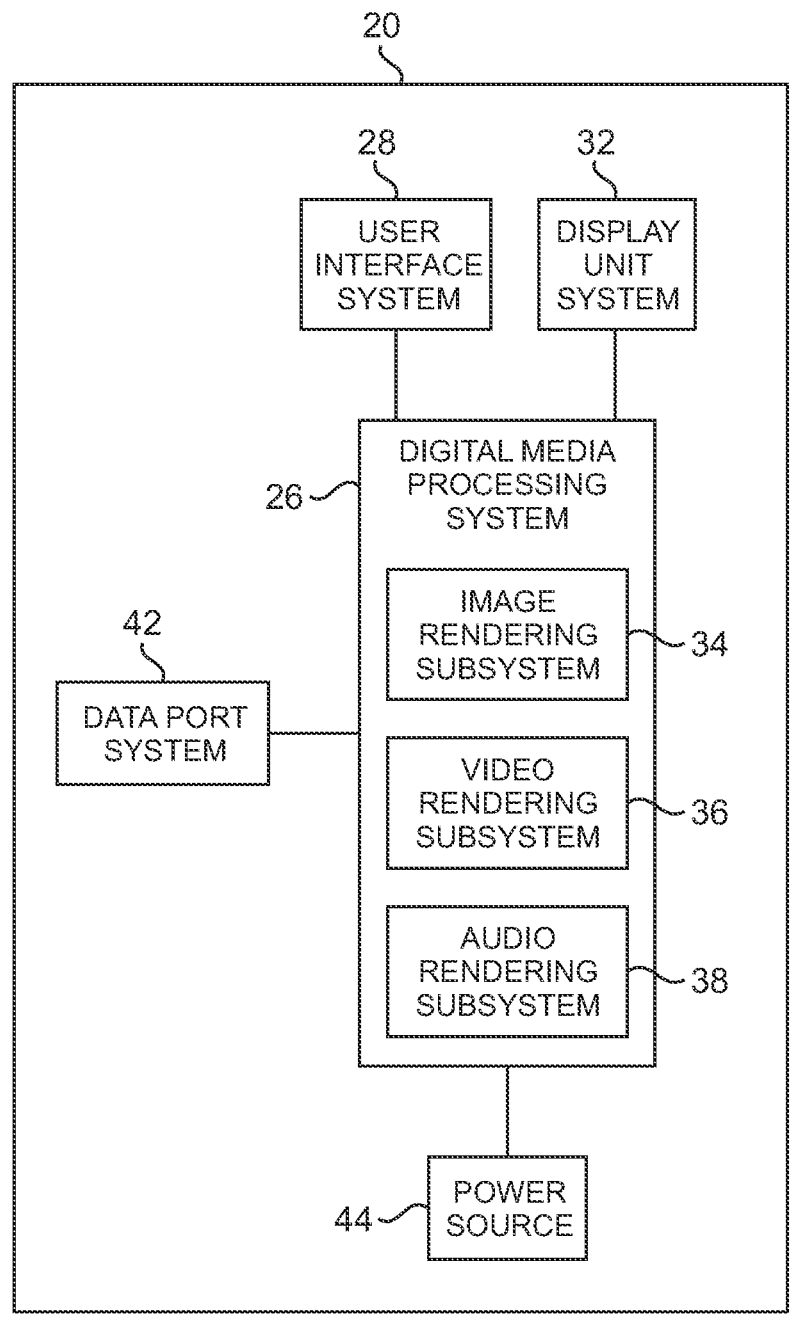
FIG. 2 is a simplified block diagram that shows various functional components of an illustrative example of a portable device.

FIG. 2 illustrates a simplified block diagram that shows various illustrative functional components of the portable device 20. The functional components include a digital media processing system 26, a user interface system 28, a display unit system 32, a power source system 44, and a data port system 42. The digital media processing system 26 further comprises an image rendering subsystem 34, a video rendering subsystem 36, and an audio rendering subsystem 38.

The digital media processing system 26 is the central processing system for the portable device 20 and provides functionality that is similar to that provided by the processing systems found in a variety of electronic devices such as host computers, mobile phones, PDAs, handheld game devices, digital recording and playback systems, and the like.

Some of the primary functions of the digital media processing system 26 may include receiving media content files downloaded to the player 20, coordinating storage of such media content files, recalling specific media content files on demand, and rendering the media content files into audio/visual output on the display for the user. Additional features of the digital media processing system 26 may also include searching external resources for media content files, coordinating DRM protocols for protected media content, and interfacing directly with other recording and playback systems.

As noted above, the digital media processing system 26 further includes three subsystems: the video rendering subsystem 36 which handles all functionality related to video-based media content files, which may include files in MPEG (Moving Picture Experts Group) and other formats; the audio rendering subsystem 38 which handles all functionality related to audio-based media content including, for example music in the commonly-utilized MP3 format and other formats; and the image rendering subsystem 34 which handles all functionality related to picture-based media content, including for example JPEG (Joint Photographic Experts Group), GIF (Graphic Interchange Format), and other formats. While each subsystem is shown as being logically separated, each may in fact share hardware and software components with each other and with the rest of the portable device 20, as may be necessary to meet the requirements of a particular implementation.

Functionally coupled to the digital media processing system 26 is the user interface system 28 through which the user may exercise control over the operation of the portable device 20. A display unit system 32 is also functionally coupled to the digital media processing system 26 and may comprise the display screen. Audio output through an earphone jack for playback of rendered media content may also be supported by display unit system 32. The display unit system 32 may also functionally support and complement the operation of the user interface system 28 by providing visual and/or audio output to the user during operation of the player 20.

The data port system 42 is also functionally coupled to the digital media processing system 26 and provides a mechanism by which the portable device 20 can interface with external systems in order to download media content. The data port system 42 may comprise, for example, a data synchronization connector port, a network connection (which may be wired or wireless), or other means of connectivity.

The portable device 20 has a power source system 44 that provides power to the entire device. The power source system 44 in this example is coupled directly to the digital media processing system 26 and indirectly to the other systems and subsystems throughout the player. The power source system 44 may also be directly coupled to any other system or subsystem of the portable device 20. Typically, the power source may comprise a battery, a power converter/transformer, or any other conventional type of electricity-providing power source, portable or otherwise.

Figure 3:
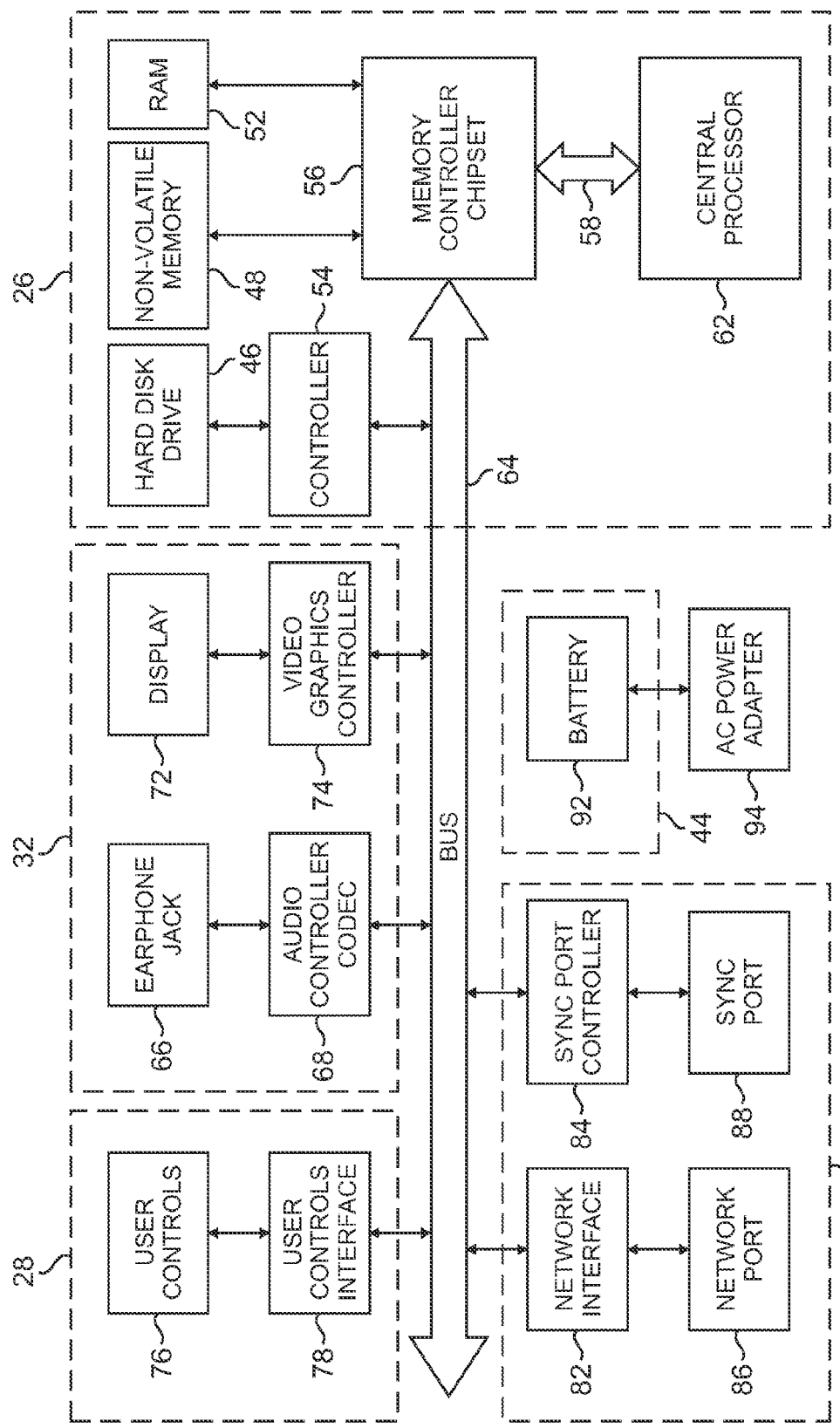
FIG. 3 is a simplified block diagram that shows various physical components of an illustrative example of a portable device.

FIG. 3 is a simplified block diagram that shows various illustrative physical components of the portable device 20 based on the functional components shown in FIG. 2 and described in the accompanying text (which are represented in FIG. 3 by dashed lines) including the digital media processing system 26, the user interface system 28, the display unit system 32, the data port system 42, and the power source system 44. While each physical component is shown as included in only a single functional component in FIG. 3, the physical components may, in fact, be shared by more than one functional component.

The physical components include a central processor 62 coupled to a memory controller/chipset 56 through, for example, a multi-pin connection 58. The memory controller/chipset 56 may be, in turn, coupled to random access memory ("RAM") 52 and/or non-volatile memory 48 such as flash memory. These physical components, through connectivity with the memory controller/chipset 56, may be collectively coupled to a hard disk drive 46 via a controller 54, as well as to the rest of the functional component systems via a system bus 64.

In the power supply system 44, a rechargeable battery 92 may be used to provide power to the components using one or more connections (not shown). The battery 92, in turn, may also be coupled to an external AC power adapter 94 or receive power via the sync cable 60 when it is coupled to the host computer 30.

The display screen is associated with a video graphics controller 74. The video graphics controller will typically use a mix of software, firmware, and/or hardware, as is known in the art, to implement the GUI. Along with the earphone jack and its associated audio controller/codec 68, these components comprise the display unit system 32 and may be directly or indirectly connected to the other physical components via the system bus 64.

The user controls 76 are associated with a user control interface 78 in the user interface system 28 that implements the user control functionality that is used to support the interaction with the GUI as described above. A network port 86 and associated network interface 82, along with the sync port 88 and its associated controller 84 may constitute the physical components of the data port system 42. These components may also directly or indirectly connect to the other components via the system bus 64.

Figure 4:
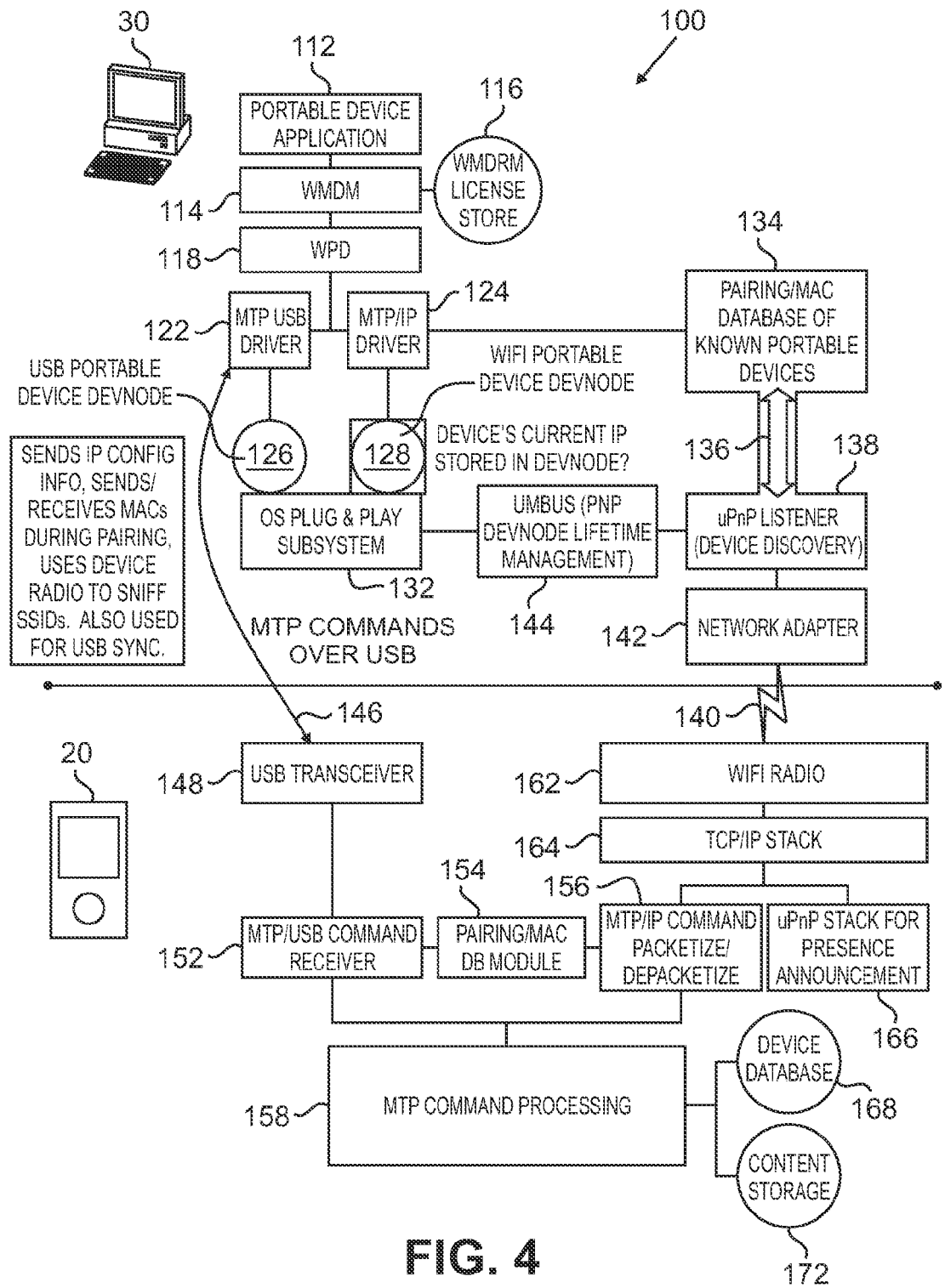
FIG. 4 illustrates a simplified functional block diagram of an arrangement for wirelessly synchronizing media and subscription content, showing in particular the wired and wireless system architecture.

FIG. 4 illustrates a simplified functional block diagram of the arrangement 100 for wirelessly synchronizing media and subscription content, showing in particular the wired and wireless system architecture. The arrangement 100 includes as noted the host computer 20 and the portable device 30. On the host computer 20 is disposed a media player application 112 which communicates with a device manager 114, shown in FIG. 4 as the Windows Media® Device Manager (WMDM). The device manager 114 is in communication with a Windows Media® Digital Rights Management (WM-DRM) license store. The device manager 114 communicates with a portable device driver 118, which in turn communicates with a driver 122 for a wired communications protocol, such as an MTP USB driver.

At the level of the MTP USB driver 122, the host computer 30 communicates with the portable device 20 through a wired connection 146 (see also link 60 in FIG. 1). The wired connection 146 communicates content items, metadata, and other data and commands using a suitable protocol, e.g., the MTP protocol. Besides USB synchronization functions, the wired connection 146 may communicate IP configuration information, MAC information during pairing, and the like. In addition, it is through this connection that a device radio 162 may be employed to detect or "sniff" for SSIDs. In particular, a radio 162 on the portable device 20 may be employed to help locate nearby accessible wireless networks by scanning for, and tuning to, certain predetermined frequencies. This aspect has a number of benefits. For example, the host computer may not have a radio or other means by which to detect or access a wireless network, though the host computer may still access the network in a wired fashion. In this way, the richer user interface capabilities of the host computer may be leveraged to complete the configuration process of the portable device.

Partial configuration information may be returned to the host computer 30 using the wired connection 146 in order to assist in the process of completing the wireless configuration process of the portable device 20, explained in greater detail below. The partial configuration information may include information about the wireless network discovered during use of the device radio 162.

The device manager 114 may also communicate with another driver for IP communications, such as an MTP/IP driver 124. The MTP/IP driver 124 may access a pairing MAC database of known portable devices 134, in order to obtain configuration information about the same. The MTP/IP driver 124 may in addition implement a wireless portable device devnode 128, which may be a WiFi portable device devnode, and which may store a portable device's current IP information.

The portable device driver 118 communicates with a portable device devnode 126, such as a USB portable device devnode, which is an internal structure that represents the portable device in the system. The devnode 126, as well as the wireless portable device devnode 128, communicate with the operating system plug-and-play subsystem 132 for peripherals.

The operating system plug-and-play subsystem 132 also communicates with a hardware driver 144 such as UMBus (user mode bus enumerator). Information is communicated between the pairing MAC database of portable devices 134 to a universal plug-and-play (uPNP) listener 138 via connection 136, which may be wired or wireless. The uPNP listener 138 accesses a wireless network via a network adaptor 142. In particular, the network adaptor 142 allows the host computer 30 to access the portable device 20 through a wireless link 140.

The portable device 20 includes a transceiver 148, which may be a USB transceiver, and into which the wired connection 146 is made. The transceiver 148 in turns communicates with a command receiver 152, and in the case of a USB transceiver, the command receiver may be a MTP/USB command receiver. The command receiver 152 then communicates with an MTP command processing module 158, which may access both a device database 168 and a content storage module 172.

As noted above, the portable device 20 also includes a radio 162 which can be tuned to and thus receive data from various frequencies including those pertaining to WiFi or other data communications bands. In this mode, the radio 162 communicates with a TCP/IP stack 164 which communicates in turn with both a MTP/IP command packetizer/depacketizer 156 and a uPNP stack for presence announcement 166. The MTP/IP command packetizer/depacketizer 156 also communicates with a Pairing MAC database module 154, which in turn communicates with the command receiver 152.

Figure 5:
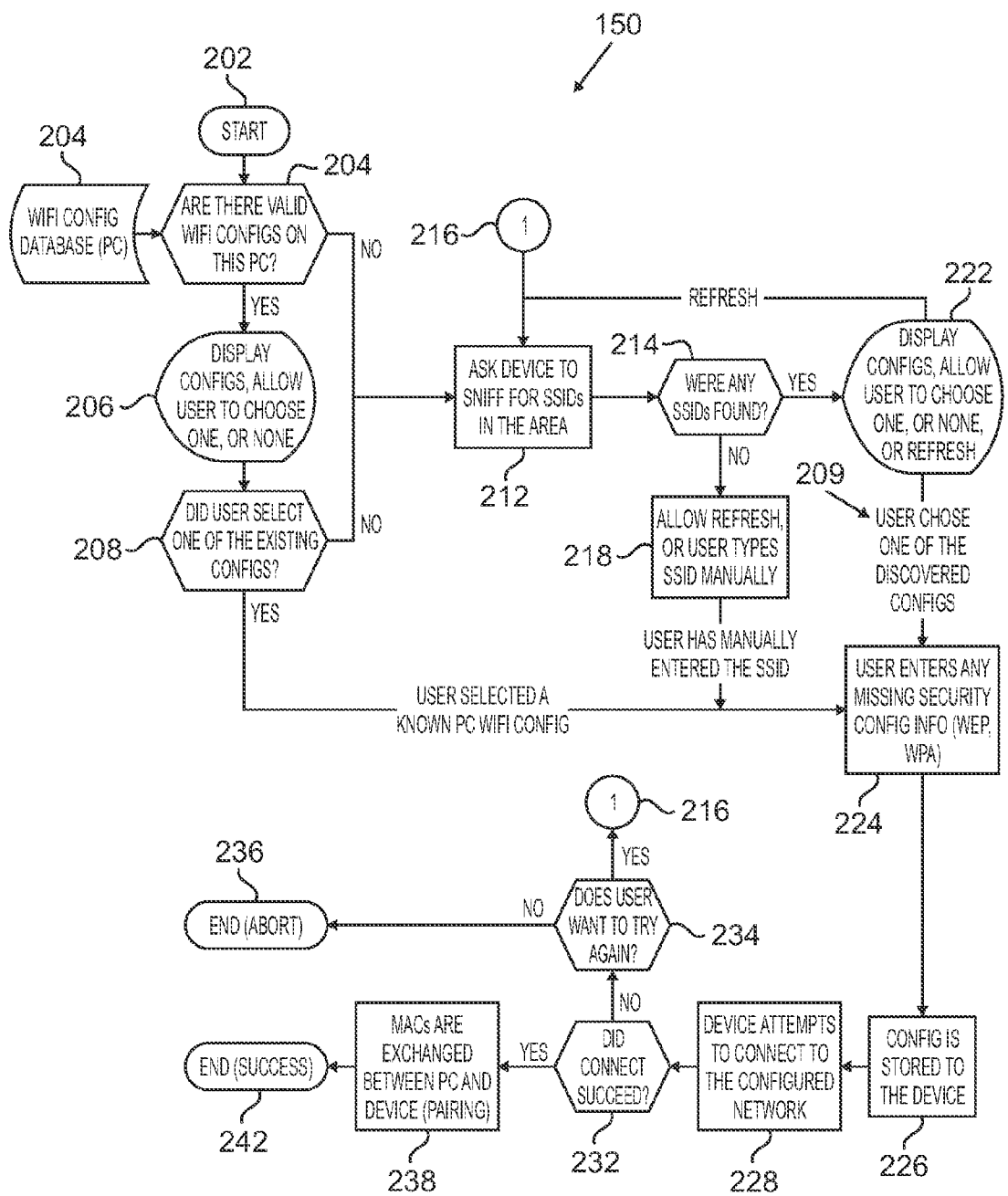
FIG. 5 illustrates a synchronization setup process in which a portable device may be configured by the host computer with a WiFi networking configuration profile, allowing the same to connect to the host computer using the wireless network.

FIG. 5 is a flowchart describing a wireless synchronization setup process 150 in which a portable device may be configured by the host computer with a WiFi networking configuration profile, allowing the portable device to connect to the host computer using the wireless network. The arrangement starts (step 202) and a first step is to determine if the host computer has stored any valid wireless configurations (step 204). The determination may be assisted by consulting a database of wireless configuration settings (step 204).

That is, if the host computer has its own wireless radio, then the arrangement may transmit all of the information from the wireless configuration of the host computer to the portable device. For example, this information may include the passphrase for the wireless network as previously entered when setting up the host computer's wireless configuration. Each such piece of information sent contributes to making the portable device's wireless configuration setup more seamless and convenient. The ability to re-use the host computer's wireless configuration setup parameters by sending the same to the portable device further simplifies the configuration process.

Returning to the flowchart, if valid wireless configurations are found, the configurations may be displayed, and the user may be prompted (step 206) to choose one (or the user may be allowed to choose no configurations).

If the user selected an existing configuration (step 208), the flow may proceed to a step where the user enters any missing security information (step 224). The configuration may be stored onto the device (step 226), and the device may attempt to connect to the network using the stored configuration (step 228). A check is then made of whether the connection succeeded (step 232). If so, media access control identifiers (MACs) may be exchanged between the host computer 30 and the portable device 20 (step 238), the same being termed "pairing". In so doing, the MTP/IP driver 124 may consult the pairing MAC database of known portable devices 134, and the pairing/MAC database module 154 in the portable device 20 may receive information over link 140 and may communicate the same back to the host computer using the wired link 146.

Returning to the upper portion of the flowchart of FIG. 5, if there are no valid wireless configurations on the host computer 30, or if the user fails to select one of the existing configurations (as the user was prompted for in step 208), then the portable device may be prompted to detect or "sniff" for service set identifiers (SSIDs) or any other such wireless sources in the area (step 212). Such detection may employ the radio in the portable device. A determination is made as to whether any SSIDs were found (step 214). If one or more SSIDs were found, then the configurations may be displayed, and the user may be prompted (step 222) to choose one (or the user may be allowed to choose no configurations). If the user selects an existing configuration (step 209), the flow may proceed to the step where the user enters any missing security information (step 224). The flow then proceeds as above.

If no SSIDs were found, then a refresh may be allowed, or the user may enter an SSID manually (step 218). If the user enters the SSID manually, then flow again passes to the step where the user enters any missing security information (step 224). The flow then proceeds following step 224.

The above description branched at the point where a determination was made about whether a connection succeeded, and if so the flow passed to step 238. If, however, the connection did not succeed, then flow may pass to a step of prompting the user to try again (step 234). If they do not, then the process may end (step 236). If the user wishes to try again, then the flow may be passed to step 216 which results in the portable device 20 again attempting to sniff for wireless access points (step 212). At the conclusion of the steps of the flowchart 150, the portable device 20 may be properly configured to interact wirelessly with the media content delivery service 50 through the network 40.

The above FIGS. 4 and 5 employed the user interface of a host computer 30 to configure a wireless portable device's network connections parameters. In this fashion, the generally-richer user interface features of a host computer allow an easier and more convenient user experience, as opposed to configuring a portable device using only a user interface available on the portable device.

Once a synchronization relationship between the portable device and a media library on a host computer is established, periodically updated content, such as podcasts, may be discovered and subscribed to using software on the host computer, and such content then synchronized with the host computer. Sufficient information may be provided to a portable device to allow for management of the subscription and download of periodic updates of episodic content (or any other content) using the device's own wireless connection, with no explicit need for the host computer to procure ongoing content updates from the publishing source, which is usually located on the internet. A user may also provide the content to another device, similarly configured for wireless connection to a network.

Figure 6:
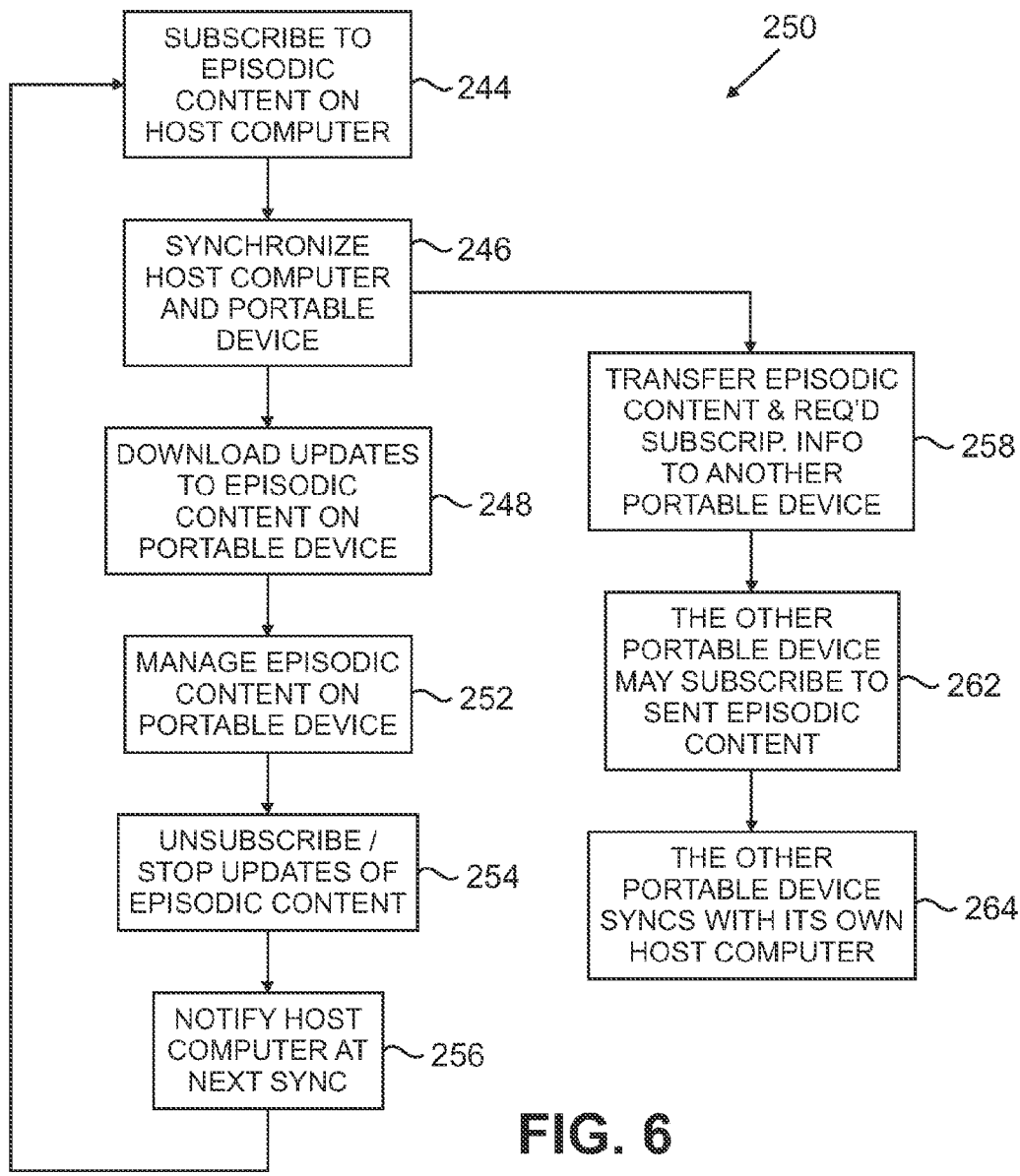
FIG. 6 is a flow chart describing an arrangement for wirelessly managing content on a portable device, as well as for sharing content between devices.

For example, referring to FIG. 6, a flowchart 250 is shown for configuring wireless downloading and management of episodic or other content on a portable device. The user has subscribed to episodic or other such content on their host computer (step 244). The host computer and portable device are then synchronized (step 246). Updates to the episodic content, such as new episodes, may then be downloaded in a wireless fashion directly to the portable device (step 248). The portable device, having received a subscription from the media library of the host computer, may choose to manage the content (step 252), which may include a step of unsubscribing from the content and stopping further periodic updates (step 254). This or any other management information may then be transmitted back to the host computer during the synchronization process (step 256).

In some implementations, the portable device, having received certain episodic content from the host computer, may send those episodes wirelessly to another device (step 258), e.g., another portable device or even to a host computer. In so doing, the portable device may wirelessly send a recommendation signal upstream through the wireless network to a media content provider, and the same may automatically send a sample copy of the content, e.g., a podcast, downstream to the other portable device. The sample copy may be, e.g., the latest edition of the episodic content. In some implementations, one portable device may send content directly, with no intermediary system, to another portable device (or other such computing device). For example, such communications may be via Bluetooth or via other techniques as known or as will be later-developed.

All information necessary to subscribe or unsubscribe to the series, such as the Uniform Resource Locator (URL) to the podcast's "RSS" file, which is a file of XML-formatted data describing the series and its episodes, may be transmitted between the two devices, or between devices and their associated host computer.

The recipient of the episodic content may be given the choice to subscribe to that content themselves (step 262) from the portable device user interface, e.g., during or after consumption of the media content. The subscription may be organized using the information provided above. The other portable device may then synchronize with an associated host computer (step 264), and the associated host computer may itself begin to receive the episodic content.

In some cases, due to design or due to portable device constraints, this feature may be limited to devices within a certain family, such as those of a particular model or type.

Figure 7:
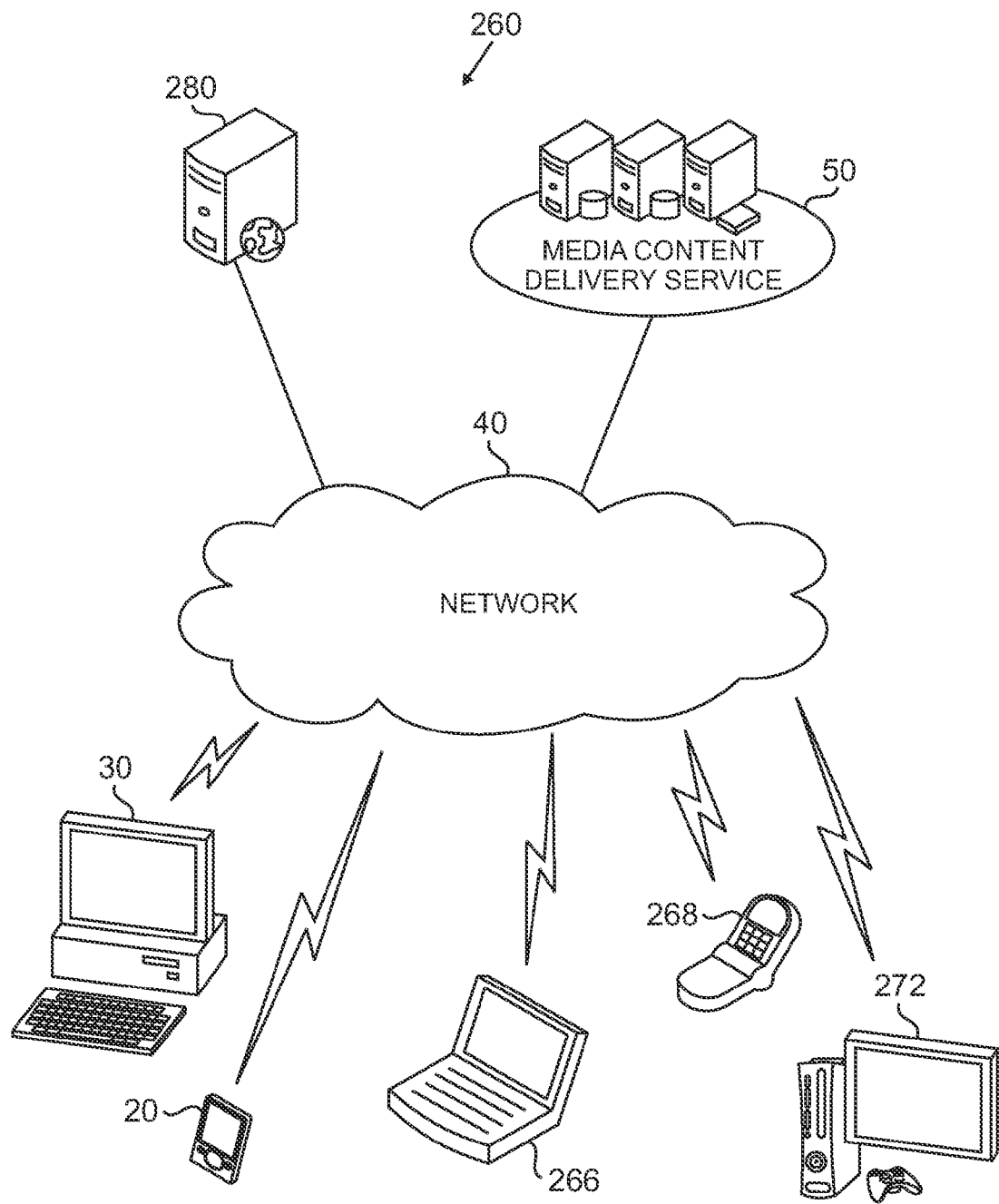
FIG. 7 is a schematic diagram depicting components in an arrangement in which multiple associated devices, including portable devices and host computers, may be synchronized to a central user profile.

Referring to FIG. 7, in an arrangement 260 relating to wireless podcasting management, the user's subscription data (including but not limited to: which series to subscribe to, how often to check for new episodes, which episodes have already been consumed, bookmarks into partially-consumed episodes, the order in which to play back episodes, and so forth) may be stored in a single user profile stored on a web server 280 associated with a user login or identity. In this way, a variety of possible playback devices, including host computer 30, portable device 20, multipurpose gaming console 272 such as the Xbox 360® game console, laptop computers 266, mobile phones 268, and other computing devices, may use this single web-based data store to determine what actions to take locally in order to globally implement the current state of all user subscriptions. Such actions may include downloading local copies of series episodes from the original publisher, deleting episodes which can be determined to have been completely consumed elsewhere using another device, beginning playback at an updated location due to prior consumption activity, adding new subscriptions, or removing subscriptions to which the user unsubscribed by using another device.

Figure 8:
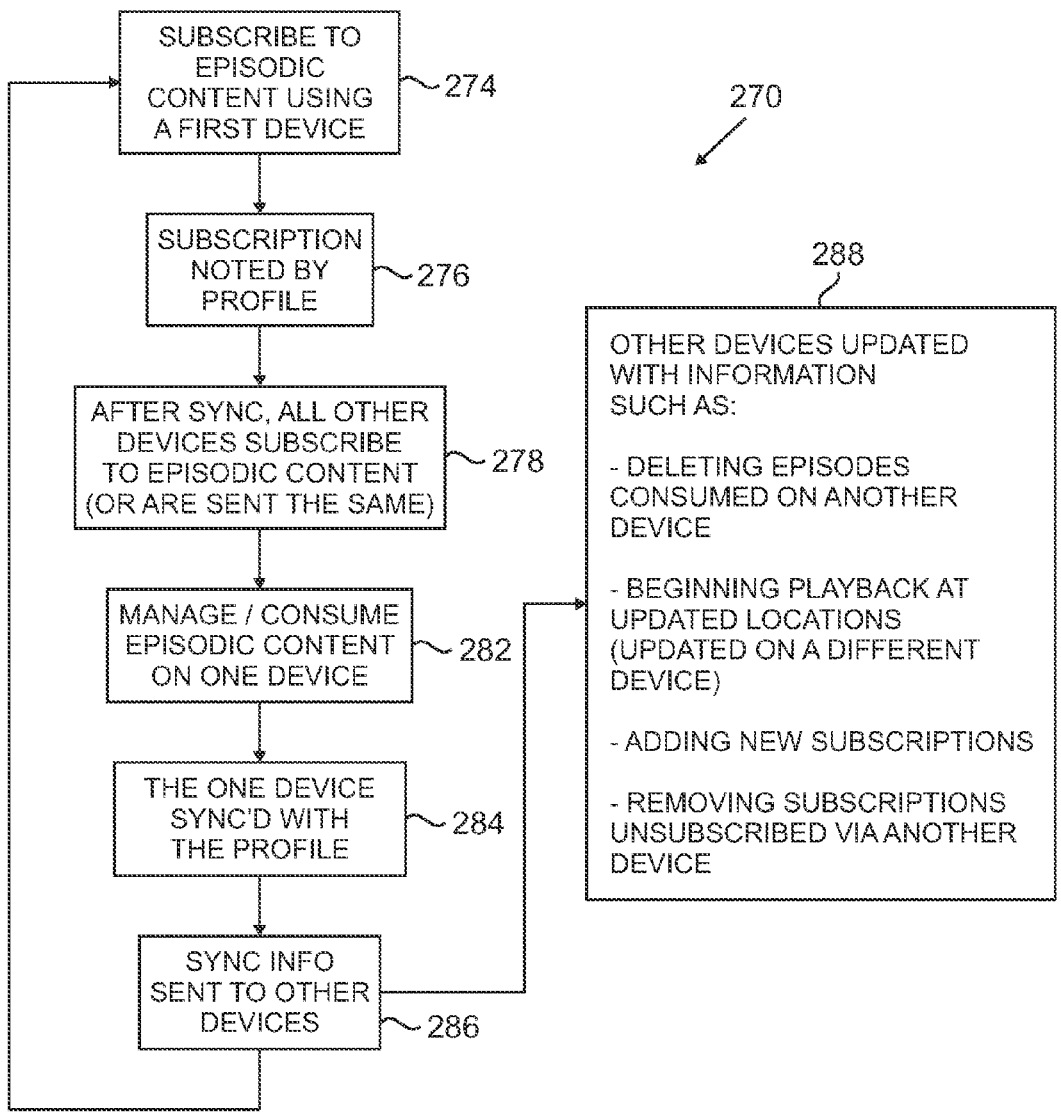
FIG. 8 is a flowchart describing exemplary steps that may be employed in the arrangement of FIG. 7.

A flowchart 270 of this arrangement is illustrated in FIG. 8. In that figure, a first step is that episodic content, such as a podcast, is subscribed to using a first device (step 274). This first device may be a portable device, a host computer, or any other computing device. A next step is that the subscription may be noted (step 276) by the user profile stored on web server 280. In performing step 276, a wireless synchronization may occur between the portable device and the user profile on the web server or a message may be sent to the web server 280 notifying the same of the subscription. Notification of the subscription may then be sent to all other devices associated with the user (step 278), either by a messaging step or by those devices' respective synchronizations, such as with the user profile or with individual other devices.

A user may then consume or manage content on any of the devices in the network (step 282). That device is then synchronized with the profile (step 284). In this synchronization, the user profile stores the results of the content consumption or management on the one device, and indeed stores results of content consumption and management on all associated devices. The user profile sends or synchronizes with all devices in the network, so that each is made aware of the current state of the media consumption and management (step 286). Each device is then kept up-to-date with all other devices, and various ways in which they are maintained in an up-to-date fashion are shown in box 288 of FIG. 8.

The arrangements described here provide a feature-rich way to wirelessly synchronize media and subscription content between portable devices and host computers. Numerous variations will be apparent. For example, host computers should be construed to be much more than just desktop or laptop computers; the term may also encompass any computing device. In the same way, a portable device may include any type of device on which media content items may be consumed, and the term is not limited to simply mp3 players. That is, the principles of the present arrangement may be generally applied to other devices beyond media players. Such devices include, for example, mobile phones, PDAs, smart phones, handheld game devices, ultra-mobile computers, devices including various combinations of the functionalities provided therein, and the like. While the arrangement has been primarily described using USB wired connections, any sort of wired connection may be employed, e.g., Firewire®. While the arrangement has been primarily described using SSIDs employed in 802.11 wireless LANs, any sort of identifier for wireless LANs may be sniffed.

Figure 9:
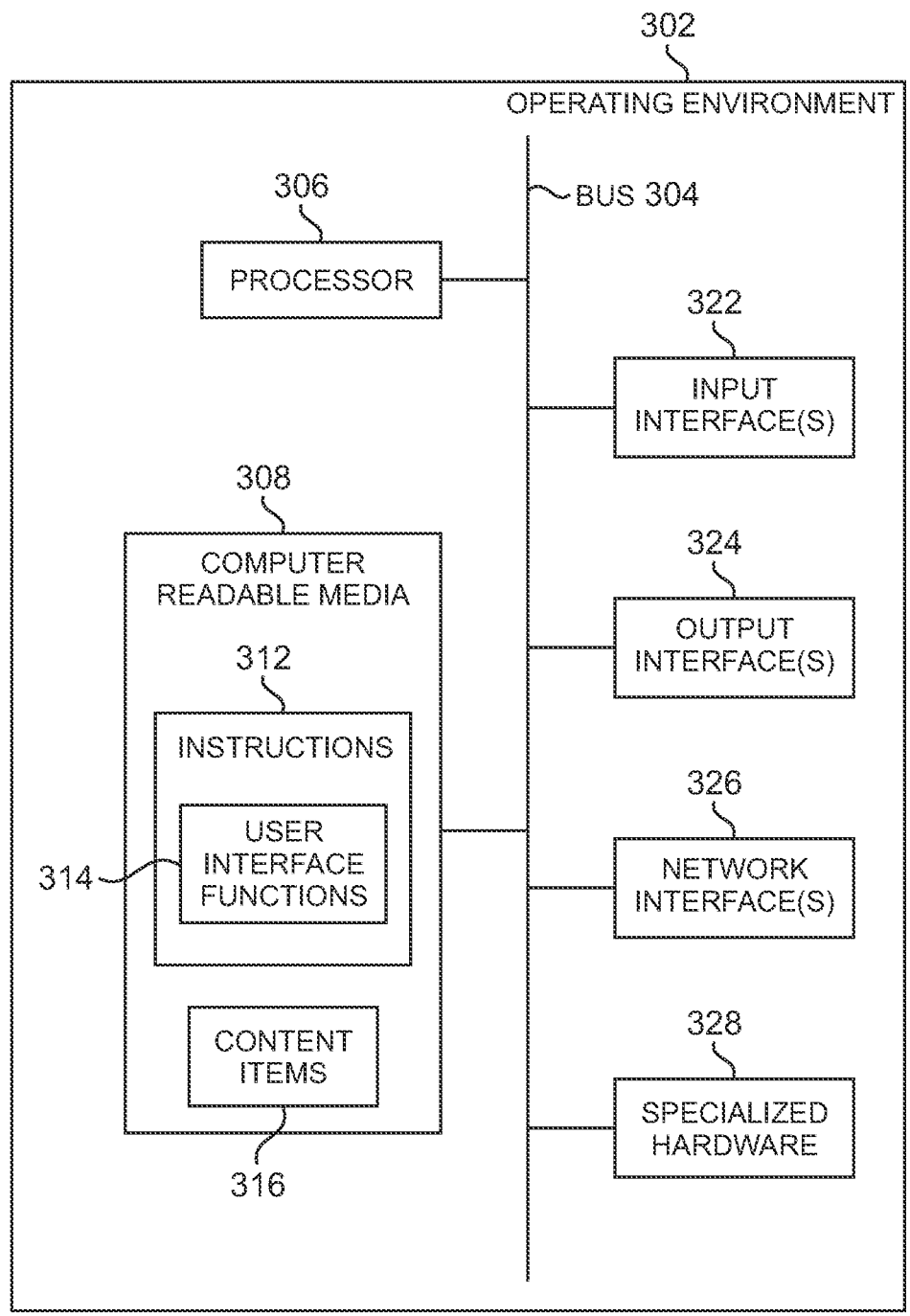
FIG. 9 is a simplified functional block diagram of an exemplary configuration of an operating environment in which the arrangement for wirelessly synchronizing media and subscription content may be implemented or used.

FIG. 9 is a block diagram of an exemplary configuration of an operating environment 302 in which all or part of the arrangements and/or methods shown and discussed in connection with the figures may be implemented or used. For example, the operating environment may be employed in either the portable device 30, the host computer 20, or both. Operating environment 302 is generally indicative of a wide variety of general-purpose or special-purpose computing environments, and is not intended to suggest any limitation as to the scope of use or functionality of the arrangements described herein.

As shown, operating environment 302 includes processor 306, computer-readable media 308, and computer-executable instructions 312. One or more internal buses 304 may be used to carry data, addresses, control signals, and other information within, to, or from operating environment 302 or elements thereof.

Processor 306, which may be a real or a virtual processor, controls functions of the operating environment by executing computer-executable instructions 312. The processor may execute instructions at the assembly, compiled, or machine-level to perform a particular process.

Computer-readable media 308 may represent any number and combination of local or remote devices, in any form, now known or later developed, capable of recording, storing, or transmitting computer-readable data, such as computer-executable instructions 312 which may in turn include user interface functions 314 and content items 316. In particular, the computer-readable media 308 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 312 represent any signal processing methods or stored instructions. Generally, computer-executable instructions 312 are implemented as software components according to well-known practices for component-based software development, and are encoded in computer-readable media. Computer programs may be combined or distributed in various ways. Computer-executable instructions 312, however, are not limited to implementation by any specific embodiments of computer programs, and in other instances may be implemented by, or executed in, hardware, software, firmware, or any combination thereof.

Input interface(s) 322 are any now-known or later-developed physical or logical elements that facilitate receipt of input to operating environment 302.

Output interface(s) 324 are any now-known or later-developed physical or logical elements that facilitate provisioning of output from operating environment 302.

Network interface(s) 326 represent one or more physical or logical elements, such as connectivity devices or computer-executable instructions, which enable communication between operating environment 302 and external devices or services, via one or more protocols or techniques. Such communication may be, but is not necessarily, client-server type communication or peer-to-peer communication. Information received at a given network interface may traverse one or more layers of a communication protocol stack.

Specialized hardware 328 represents any hardware or firmware that implements functions of operating environment 302. Examples of specialized hardware include encoders/decoders, decrypters, application-specific integrated circuits, clocks, and the like.

The methods shown and described above may be implemented in one or more general, multi-purpose, or single-purpose processors.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-implemented method to configure wireless network settings on a portable computing device, the method comprising the steps of:
    establishing a synchronization connection between the portable computing device and a personal computer;
    receiving, by the portable computing device from the personal computer over the synchronization connection, a request to detect wireless access points;
    detecting, by a radio module in the portable computing device, one or more wireless access points in response to receiving the request;
    sending, from the portable computing device to the personal computer over the synchronization connection, partial configuration information including an identifier for each of the one or more wireless access points detected by the radio module;
    receiving, at the portable computing device from the personal computer over the synchronization connection, a networking configuration profile created by the personal computer for configuring the portable computing device to connect to a particular wireless access point detected by the radio module, wherein the networking configuration profile is created by the personal computer based on the partial configuration information and configuration parameters used by the personal computer to connect to the particular wireless access point; and
    transmitting, from the portable computing device to the personal computer, an indication that the portable computing device succeeded in establishing a wireless connection using the particular wireless access point.

2. The computer-implemented method of claim 1, further comprising:
    receiving, at the portable computing device, pairing data from the personal computer over the wireless connection.

3. The computer-implemented method of claim 1, wherein the networking configuration parameters used by the personal computer to connect to the particular wireless access point include a passphrase for the particular wireless access point.

4. The computer-implemented method of claim 1, further comprising:
    performing a synchronization operation using the wireless connection between the portable computing device and the personal computer, the portable computing device having stored thereon a subscription to episodic content; and
    transmitting, from the portable computing device to the personal computer over the wireless connection, input received at the portable computing device for making a change to a media library on the personal computer.

5. The computer-implemented method of claim 4, wherein the change is to unsubscribe from the episodic content.

6. The computer-implemented method of claim 4, further comprising:
    transmitting, from the portable computing device to the personal computer, subscription information for subscribing to the episodic content.

7. The computer-implemented method of claim 4, further comprising:
    transmitting, to the personal computer, an item of the episodic content stored on the portable computing device.

8. The computer-implemented method of claim 4, further comprising:
    transmitting a signal to a media content delivery service, the signal causing the media content delivery service to download an item of the episodic content.

9. The computer-implemented method of claim 1, further comprising:
    establishing a synchronization relationship between the portable computing device and a user profile on a web server, wherein the user profile on the web server includes a synchronization relationship with the personal computer and a synchronization relationship with another device;
    performing a synchronization operation with the user profile on the web server; and
    making a change to a subscription to episodic content on the portable computing device that reflects a change to the subscription to the episodic content made by the personal computer or the another device.

10. A computer-readable storage device storing computer-executable instructions that, when executed by one or more processors disposed in a portable computing device, implement a method to configure wireless network settings on the portable computing device, the method comprising the steps of:
    establishing a synchronization connection between the portable computing device and a personal computer;
    receiving, by the portable computing device from the personal computer over the synchronization connection, a request to detect wireless access points;
    detecting, by a radio module in the portable computing device, one or more wireless access points in response to receiving the request;
    sending, from the portable computing device to the personal computer over the synchronization connection, partial configuration information including an identifier for each of the one or more wireless access points detected by the radio module;
    receiving, at the portable computing device from the personal computer over the synchronization connection, a networking configuration profile created by the personal computer for configuring the portable computing device to connect to a particular wireless access point detected by the radio module, wherein the networking configuration profile is created by the personal computer based on the partial configuration information and configuration parameters used by the personal computer to connect to the particular wireless access point; and
    transmitting, from the portable computing device to the personal computer, an indication that the portable computing device succeeded in establishing a wireless connection using the particular wireless access point.

11. The computer-readable storage device of claim 10, further storing computer-executable instructions for:

receiving, at the portable computing device, pairing data from the personal computer over the wireless connection.

12. The computer-readable storage device of claim 10, wherein the networking configuration parameters used by the personal computer to connect to the particular wireless access point include a passphrase for the particular wireless access point.

13. The computer-readable storage device of claim 10, further storing computer-executable instructions for:
performing a synchronization operation using the wireless connection between the portable computing device and the personal computer, the portable computing device having stored thereon a subscription to episodic content; and
transmitting, from the portable computing device to the personal computer over the wireless connection, input received at the portable computing device for making a change to a media library on the personal computer.

14. The computer-readable storage device of claim 13, wherein the change is to unsubscribe from the episodic content.

15. The computer-readable storage device of claim 13, further storing computer-executable instructions for:
transmitting, from the portable computing device to the personal computer, subscription information for subscribing to the episodic content.

16. The computer-readable storage device of claim 13, further storing computer-executable instructions for:
transmitting, to the personal computer, an item of the episodic content stored on the portable computing device.

17. The computer-readable storage device of claim 13, further storing computer-executable instructions for:
transmitting a signal to a media content delivery service, the signal causing the media content delivery service to download an item of the episodic content.

18. The computer-readable storage device of claim 10, further storing computer-executable instructions for:
establishing a synchronization relationship between the portable computing device and a user profile on a web server, wherein the user profile on the web server includes a synchronization relationship with the personal computer and a synchronization relationship with another device;
performing a synchronization operation with the user profile on the web server; and
making a change to a subscription to episodic content on the portable computing device that reflects a change to the subscription to the episodic content made by the personal computer or the another device.

19. A portable computing device comprising:
one or more processors for executing computer-executable instructions; and
memory storing computer-executable instructions for performing a method to configure wireless network settings on the portable computing device, the method comprising the steps of:
establishing a synchronization connection between the portable computing device and a personal computer;
receiving, by the portable computing device from the personal computer over the synchronization connection, a request to detect wireless access points;
detecting, by a radio module in the portable computing device, one or more wireless access points in response to receiving the request;
sending, from the portable computing device to the personal computer over the synchronization connection, partial configuration information including an identifier for each of the one or more wireless access points detected by the radio module;
receiving, at the portable computing device from the personal computer over the synchronization connection, a networking configuration profile created by the personal computer for configuring the portable computing device to connect to a particular wireless access point detected by the radio module, wherein the networking configuration profile is created by the personal computer based on the partial configuration information and configuration parameters used by the personal computer to connect to the particular wireless access point; and
transmitting, from the portable computing device to the personal computer, an indication that the portable computing device succeeded in establishing a wireless connection using the particular wireless access point.

20. The portable computing device of claim 19, wherein the memory further stores computer-executable instructions for:
receiving, at the portable computing device, pairing data from the personal computer over the wireless connection.

21. The portable computing device of claim 19, wherein the networking configuration parameters used by the personal computer to connect to the particular wireless access point include a passphrase for the particular wireless access point.

* * * * *